United States Patent
Desai et al.

(10) Patent No.: US 6,597,695 B1
(45) Date of Patent: *Jul. 22, 2003

(54) BIT ROBBING ATM CHANNELS

(75) Inventors: Bhavesh Desai, Livingston, NJ (US); Peter D. Magill, Freehold, NJ (US); Norman Ashton Whitaker, Atlantic Highlands, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/682,060

(22) Filed: Jul. 16, 1996

(51) Int. Cl.[7] .............................................. H04L 12/56
(52) U.S. Cl. ................................... 370/395.1; 370/523
(58) Field of Search ............................... 370/522, 523, 370/527, 528, 529, 395, 396, 397, 398, 399, 409, 410, 465, 468, 474, 477, 395.1; 348/6, 7, 384, 390, 423

(56) References Cited

U.S. PATENT DOCUMENTS

| | | | | |
|---|---|---|---|---|
| 5,467,349 A | * | 11/1995 | Huey et al. | 370/397 |
| 5,487,061 A | * | 1/1996 | Bray | 370/252 |
| 5,511,065 A | * | 4/1996 | Yonehara | 370/252 |
| 5,627,836 A | * | 5/1997 | Conoscenti et al. | 370/397 |
| 5,636,222 A | * | 6/1997 | Uriu et al. | 370/390 |
| 5,650,825 A | * | 7/1997 | Naimpally et al. | 348/465 |
| 5,663,959 A | * | 9/1997 | Nakagawa | 370/395 |
| 5,751,723 A | * | 5/1998 | Vanden Heuvel et al. | 370/528 |

* cited by examiner

*Primary Examiner*—Kwang Bin Yao

(57) ABSTRACT

A method and system for robbing bits in an ATM channel for forming a robbed bit stream. Unused portions of the header in an ATM cell stream are robbed to form a new robbed bit stream. Information is inserted into the new robbed bit stream and sent to a service area. The information in the robbed bit stream is then extracted and input into information appliances in, for example, homes. The information in the robbed bit stream can include an additional video channel, a program guide or other information.

19 Claims, 2 Drawing Sheets

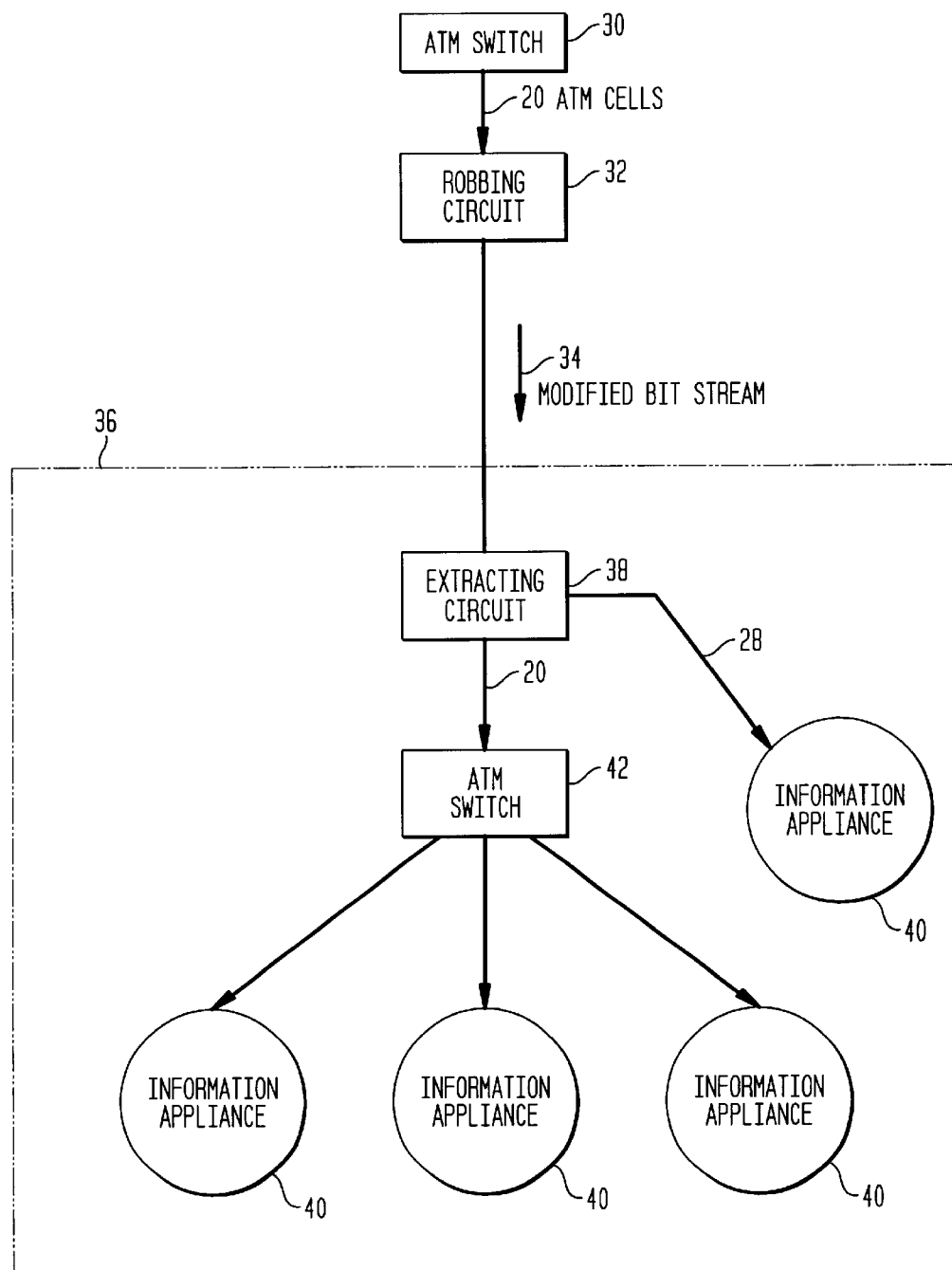

BIT ROBBING ATM CHANNELS

BACKGROUND OF THE INVENTION

1. Field of the Invention

The present invention is directed to a method and apparatus for robbing bits in an ATM cell stream, and more particularly, to inserting information into the robbed bits to form a new robbed bit stream.

2. Description of the Related Art

A standard format for digital video transmission has not yet been adopted. A standard for ATM access has also not yet been adopted. In the United States, a 6 MHz channel plan for National Television Standards Committee (NTSC) video broadcast has been the accepted standard. The desirability of incorporating other information streams, e.g., teletext, into the digital video stream has been recognized, but has not been realized. However, whatever the standards to be adopted in the future, maximum use of an ATM cell will be required.

ATM access makes use of ATM cells to transmit information from the headend of a system to, for example, individual homes in a serving area. The ATM standard provides a fifty-three (53) byte cell including a payload of 48 bytes and a five byte header. The five byte header includes one byte for header error control (HEC), a status half-byte, including payload type bits (PT) and cell loss priority bits (CLP). The remaining three and one-half (3½) bytes are apportioned in two different ways depending upon where the signals are in the overall network. These two interfaces are known as a user to network interface (UNI) and a network to network interface (NNI). According to the ATM standard, all 3½ bytes (28 bits) are used for addresses at the NNI while according to the ATM standard 3 bytes (24 bits) are used for addresses at the UNI and the remaining half-byte is reserved for generic flow control (GFC). However, in an access environment, only 10–12 bits are needed for addresses. The remaining 12 to 18 bits need not be used for ATM addressing.

SUMMARY OF THE INVENTION

The present invention provides a method and system for robbing bits from a header in an ATM cell. An ATM switch at an office assigns and places information into the header portion of an ATM cell stream. Not all of the bits in the header portion of the ATM cell stream are used. A circuit "robs" the unused bits from the header portion and then inserts information into the unused bits in the header portion. A terminal unit at a subscriber end is provided for extracting the information from the unused bits and inputting the information to various information appliances.

The above-mentioned features and advantages of the present invention are achieved by employing a method providing an ATM cell stream, identifying unused portions of the ATM cell stream, robbing bits from the unused portions of the ATM cell stream to form a robbed bit stream, inserting information into the robbed bits, and extracting the information from the robbed bit stream at a subscriber end.

In addition, a system is provided including an ATM switch for outputting an ATM cell stream, a unit for robbing bits from the cell stream, a unit for inserting information into the robbed bits of the cell stream and a unit for extracting the inserted information.

The above features provide the advantages that additional information can be carried, such as, for example, a program guide or an additional broadcast video channel.

These objects, together with other objects and advantages which will be subsequently apparent, reside in the details of construction and operation as more fully described and claimed, reference being had to the accompanying drawings forming a part hereof, like reference numerals referring to like parts throughout.

BRIEF DESCRIPTION OF THE DRAWINGS

FIG. 2 is a diagram of a system using the bit robbing architecture shown in FIG. 1.

DESCRIPTION OF THE PREFERRED EMBODIMENTS

Figure 1:
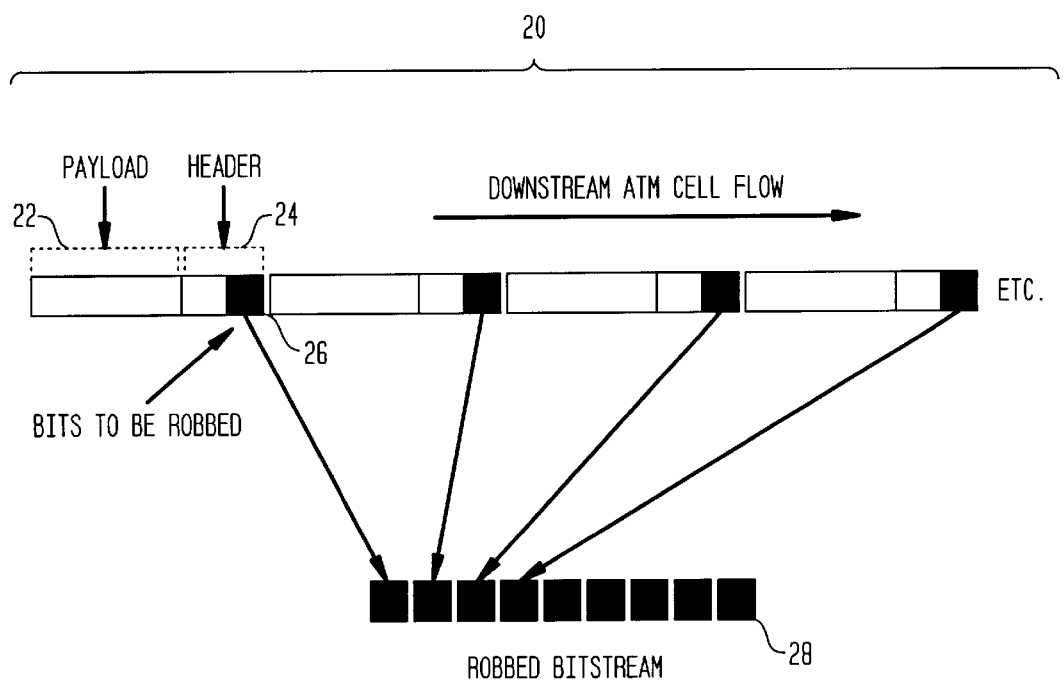
FIG. 1 is a diagram of a bit robbing architecture.

In general, ATM specifies packet format and routing information. In some access networks, all information in an ATM cell stream 20, including a payload 22 and a header 24, is sent to all subscribers on a network. Each terminal filters the packets out of the ATM cell stream 20 and passes them to a specific subscriber based on the addressing in the header 24. As noted above, there are unused bits in the header address. The present invention makes use of the unused bits in the header address.

As shown in FIG. 1, the present invention robs unused address bits 26 from the ATM cell stream 20. These robbed bits 26 then make up a new robbed bit stream (channel) 28. Because bits from the address are robbed and present ATM standards are violated, standard ATM addressing cannot be easily applied within the robbed bit stream 28. Therefore, the present invention is useful in applications in which every subscriber in the system receives the ATM cell stream 20 and uses the information transmitted in the robbed bit stream 28. Such an application would be, for example, a program guide or an entire additional broadcast video channel depending on the number of the unused bits. For example, if the ATM cell stream 20 is transmitted at 30 Mb/s, then the robbed bit stream 28 could be as much as 1.27 Mb/s.

FIG. 2 is a diagram of a system using the present invention. An ATM switch 30 outputs the ATM cell stream 20 including the payload 22 and header 24. The ATM cell stream 20, including header error control signals (HEC), is then input to a "robbing" circuit 32 which operates under conventional conditions. The robbing circuit 32 overwrites the unused (robbed) bits 26 of the ATM cell stream 20 which will form the robbed bit stream 28. For example, of the 3 bytes of address, 10 bits are used for addressing, and the remaining 14 bits are overwritten with additional information to form a modified bit stream 34. The modified bit stream 34, which includes the overwritten bits and the "normal" bits, is then sent to, for example, individual homes 36 in a serving area. In or near the individual homes 36, an extractor circuit 38, which is, for example, a conventional digital circuit, is provided which receives the modified bit stream 34, extracts the information in the overwritten bits to form a robbed bit stream 28, replaces the overwritten bits in the modified bit stream 34 with, for example, all zeroes, calculates a new HEC, passes the extracted information in the robbed bit stream 28 to information appliances 40 within the individual homes 36, and passes the ATM cell stream 20 to an ATM switch 42 to appropriate devices, such as, as shown in FIG. 2, selected information appliances 40. The information appliances 40 can be, for example, a computer, TV, Web TV, etc., but are not limited to these devices.

Thus, the present invention can carry an additional video channel or other information, albeit in violation of protocol layering, and other formal tools which are used in the development of protocols,. only over the link between the headend and subscriber terminal. That is, the present invention only violates protocol over one link in the system, it does not corrupt the data stream.

The foregoing is considered as illustrative only of the principles of the invention. Further, since numerous modifications and changes will readily occur to those skilled in the art, it is not desired to limit the invention to the exact construction and applications and equivalents may resorted to, falling within the scope of the invention and the appended claims and their equivalents.

What is claimed is:

1. A method for robbing one or more bits in an ATM cell, said method comprising the steps of:
   a) identifying, for a given environment, portions of the ATM cell's bits that are not required; and
   b) overwriting the ATM cell's bits identified in step a) with bits from additional information, thereby robbing bits in the ATM cell violating the ATM protocol.

2. A method according to claim 1, wherein an information appliance extracts the additional information.

3. A method according to claim 2, further comprising the steps of:
   a) outputting the ATM cell to an ATM switch; and
   b) distributing the ATM cell to a plurality of selected information appliances.

4. The method of claim 2, wherein the additional information originate from a different source than the ATM cell.

5. The method of claim 4, further comprising the step of:
   broadcasting the ATM cell to a plurality of information appliances serviced by the headend station.

6. The method of claim 5, wherein the ATM cell is part of a data stream containing audio and/or video signals.

7. The method of claim 6, wherein the additional information is part of a data stream containing audio and/or video signals.

8. A system for robbing bits in an ATM cell, said system comprising:
   means for receiving the ATM cell;
   means for identifying unused bits in the header of the ATM cell for a given environment; and
   means for overwriting additional information into said unused bits of the ATM cell, thereby robbing bits in the ATM cell violating the ATM protocol.

9. A system according to claim 8, further comprising a terminal means, the terminal means including:
   extracting means for extracting said information from said overwritten bits and for extracting normal data from the ATM cell; and
   information appliance means for selectively receiving said additional information in said unused bits and said normal data.

10. A system according to claim 9, wherein said information appliance means comprises one or more computers.

11. A system according to claim 9, wherein said information appliance means comprises one or more televisions.

12. The system of claim 9, wherein the additional information originate from a different source than the ATM cell.

13. The system of claim 9, wherein the ATM cell is part of a data stream containing audio and/or video signals.

14. The system of claim 13, wherein the additional information is part of a data stream containing audio and/or video signals.

15. A method of communicating between an ATM headend station and a plurality of information appliances, the method comprising the steps of:
   a) receiving a data packet at the headend station from a packet switched network;
   b) identifying a portion of the data packet that is not necessary to uniquely address the information appliances associated with the headend station;
   c) replacing with additional data the portion of the data packet identified in step (b); and
   d) transmitting the data packet to one or more of the plurality of information appliances, thereby robbing bits in the data packet violating the ATM protocol.

16. The method of claim 15, wherein the additional data originated from a different source than the data packet.

17. The method of claim 15, wherein the data packet is broadcast to a plurality of information appliances serviced by the headend station.

18. The method of claim 15, wherein the data packet is part of a data stream containing audio and/or video signals.

19. The method of claim 15, wherein the additional data is part of a data stream containing audio and/or video signals.

* * * * *